United States Patent
Peng et al.

(10) Patent No.: US 7,755,712 B2
(45) Date of Patent: Jul. 13, 2010

(54) ARRAY SUBSTRATE, AND METHOD FOR REPAIRING THEREOF, AND DISPLAY PANEL AND DISPLAY APPARATUS COMPRISING THE SAME

(75) Inventors: Chung-Hung Peng, Miaoli County (TW); Meng-Chieh Cheng, Taichung County (TW); Chin-Fon Chen, Taoyuan County (TW)

(73) Assignee: AU Optronics Corp., Hsin-Chu (TW)

(*) Notice: Subject to any disclaimer, the term of this patent is extended or adjusted under 35 U.S.C. 154(b) by 421 days.

(21) Appl. No.: 11/671,010

(22) Filed: Feb. 5, 2007

(65) Prior Publication Data
US 2008/0062347 A1  Mar. 13, 2008

(30) Foreign Application Priority Data
Sep. 11, 2006  (TW) .............................. 95133526 A (51) Int. Cl.
*G02F 1/1333* (2006.01)
(52) U.S. Cl. ........................................ 349/54; 349/192
(58) Field of Classification Search ................... 349/54, 349/192
See application file for complete search history.

(56) References Cited

U.S. PATENT DOCUMENTS

| | | | |
|---|---|---|---|
| 5,729,309 A | 3/1998 | Na et al. | |
| 5,767,929 A | 6/1998 | Yachi et al. | |
| 5,859,679 A * | 1/1999 | Song | 349/54 |
| 6,023,310 A | 2/2000 | Kawamoto et al. | |
| 6,078,369 A | 6/2000 | Kawamoto et al. | |
| 2004/0012727 A1 * | 1/2004 | Kim et al. | 349/54 |

FOREIGN PATENT DOCUMENTS

JP  10/123545  5/1998

* cited by examiner

*Primary Examiner*—David Nelms
*Assistant Examiner*—Thanh-Nhan P Nguyen
(74) *Attorney, Agent, or Firm*—Thomas, Kayden, Horstemeyer & Risley (57) ABSTRACT

An array substrate, and method for repairing thereof, and display panel and apparatus comprising the same are provided. The array substrate includes a base, a plurality of signal lines, and at least one repair structure. The base has an active region and a peripheral region adjoining to the active region. The signal lines are disposed on the base. The repair structure, is disposed on the peripheral region, and has at least one first repair line and at least one second repair line. The second repair line has a first sub-line and a second sub-line. The first sub-line is located between the first repair line and the second sub-line.

15 Claims, 6 Drawing Sheets

ARRAY SUBSTRATE, AND METHOD FOR REPAIRING THEREOF, AND DISPLAY PANEL AND DISPLAY APPARATUS COMPRISING THE SAME

This application claims the benefits of Taiwan Application No. 95133526, filed Sep. 11, 2006, the contents of which are herein incorporated by reference in its entirety.

BACKGROUND OF THE INVENTION

1. Field of the Invention

The present invention relates to an array substrate and method for repairing thereof, and more particularly, to an array substrate whose repair line having at least two sub-lines and method for repairing thereof.

2. Description of the Related Art

Along with the advance in manufacturing and the increase in consumer requirement, a flat display industry has entered large-scaled production. However, the occurrence of defects is inevitable during large-scaled production. Take the production of the thin film transistor (TFT) substrate of panel for example. Thousands and extremely micro signal lines are formed on a very small area of the glass substrate. It is inevitable that part of the signal lines may break off or result in poor transmission due to the occurrence of defects during the manufacturing process.

Thus, a repair line is designed to repair the problems. The repair line is a line-shaped structure, which crosses over a plurality of signal lines and is formed together with the metal layer. Once defect occurs to a signal line, the repair line and the insulation layer are penetrated by melting for the defected signal line so as to be connected to the corresponding repair line, such that signals still can be transmitted via the repair line. Thus, a defected panel is repaired and becomes usable.

However, the current repair line structure crossing over many signal lines will generate resistive-capacitive (RC) loading and cause decay in signal transmission. As the repair line crosses over more signal lines, the decay in signal transmission will become worse and the repair line will fail to properly function or pre-deteremined function.

SUMMARY OF THE INVENTION

It is therefore the present invention to provide an array substrate and method for repairing thereof. At least two sub-lines are extended from the repair line and respectively cross over different signal line groups, effectively reducing the effect of resistive-capacitive (RC) loading.

According to an embodiment of the present invention, an array substrate including a base, a plurality of signal lines, and at least one repair structure. The base has an active region and a peripheral region adjoining to the active region. The signal lines are disposed on the base. The at least one repair structure, is disposed on the peripheral region of the base, and has at least one first repair line and at least one second repair line having a first sub-line and a second sub-line. The first sub-line of the at least one second repair line is located between the at least one first repair line and the second sub-line of the at least one second repair line.

According to other embodiment of the present invention providing a method for repairing an array substrate having a plurality of signal lines, at least one first repair line and at least one second repair line having a first sub-line and a second sub-line. The first sub-line crosses over a first group of the signal lines, and the second sub-line crosses over a second group of the signal lines. The method includes when defect occurs in at least one of one signal line of the first group and one signal line of the second group, at least one of the first sub-line and the second sub-line is electrically connected to at least one of one signal line of the first group and one signal line of the second group.

According to another embodiment of the present invention providing a display panel incorporating the array substrate of the present invention.

According to further embodiment of the present invention providing a display apparatus incorporating the array substrate of the present invention.

The present invention will become apparent from the following detailed description of the preferred but non-limiting embodiments. The following description is made with reference to the accompanying drawings.

DETAILED DESCRIPTION OF THE INVENTION

First Embodiment

Figure 1A:
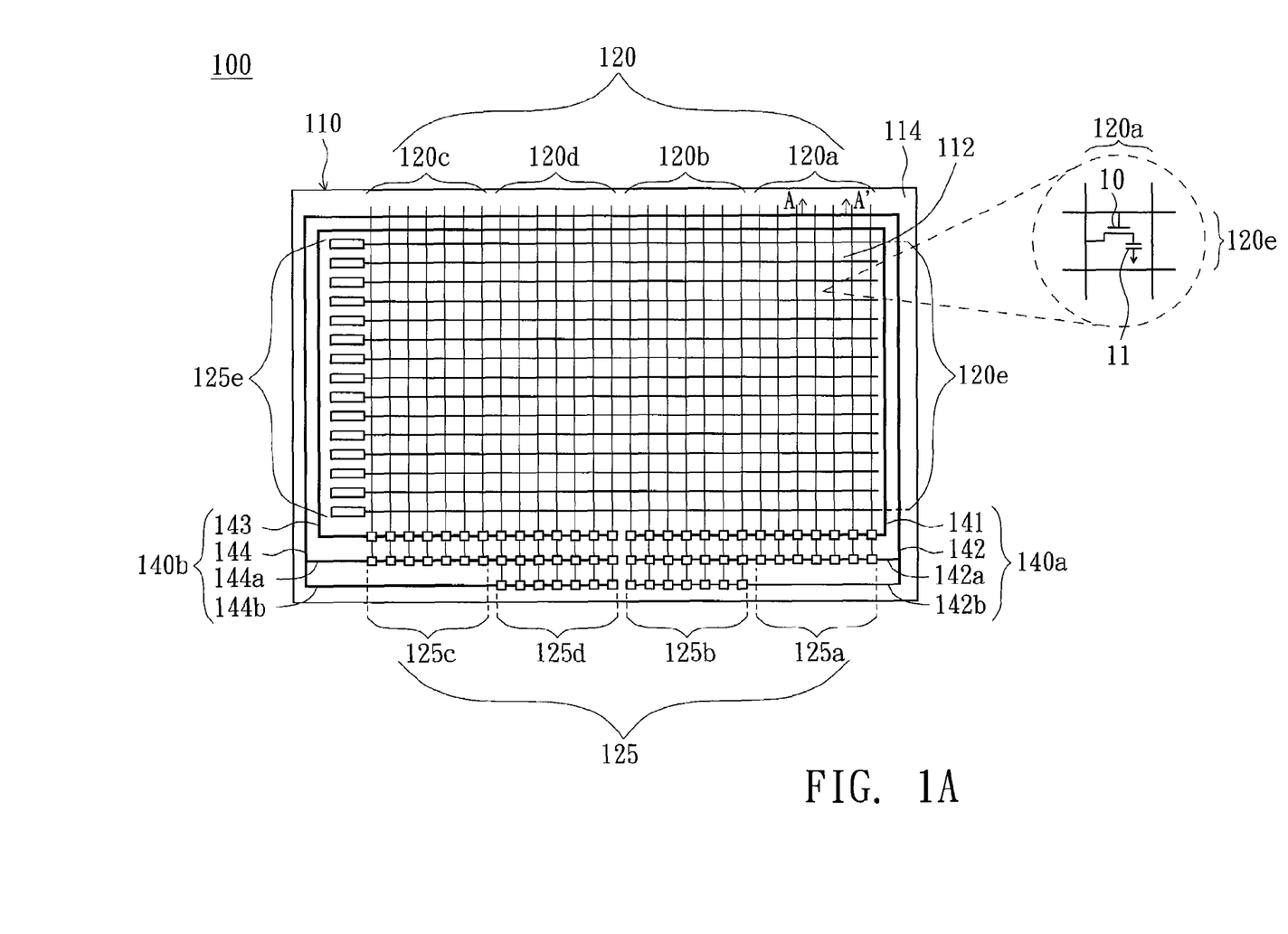
FIG. 1A is a top view of a first array substrate according to a first embodiment of the present invention.

Referring to FIG. 1A, a top view of a first array substrate according to a first embodiment of the present invention is shown. The array substrate 100 includes a base 110, a plurality of signal lines 120, and at least one repair structure 140a. The array substrate 100 is incorporated to liquid crystal display (LCD) panel, organic electroluminescence display (OELD) panel (such as organic light-emitting diodes (OLED) panel, polymer light emitting diode (PLED) panel, or likes), or other display panels, or combinations thereof. Examples of the base 110 includes transparent materials (such as glass, quartz, or other materials), flexible materials (such as plastics, polyester, polymethyl acrylamide, or other materials), or non-transparent materials (such as silicon wafer, ceramics, or other materials). The base 110 has an active region 112 and a peripheral region 114 adjoining to the active region 112. The signal lines 120 are disposed on the base 110, and are respectively connected to a plurality of pads 125. The signal lines 120 include a plurality of data lines and scan lines 120e, and are exemplified by data lines in the present embodiment of the invention. The data lines are defined as a first group 120a, a second group 120b, a third group 120c and a fourth group 120d. The scan lines 120e and the data lines are substantially interlaced with each other, and are both disposed on the base 110. The pads 125 further include a first pad group 125a, a second pad group 125b, a third pad group 125c, a fourth pad group 125d and a scan line pad group 125e. The signal lines 120 form a plurality of pixel regions (not numbered). As indicated in a partial enlargement of FIG. 1A, a pixel region is defined by a scan line 120e and a first group 120a. Each pixel region includes a thin film transistor (TFT) 10 and a capacitor 11. The capacitor 11 is coupled to a pixel electrode (not illustrated). The structure of the TFT 10 is formed by a gate, a dielectric layer, an active layer, a source/drain region, a barrier layer and a pixel electrode, and has various types including top-gate type, bottom gate type, back channel etching (BCE) type, or etching-stopper type, or other structure types. The active layer of the TFT including amorphous silicon (a-Si), poly-silicon, microcrystalline silicon, monocrystalline silicon, or a combination thereof. The active layer can also be doped with P-type, N-type dopants, or combinations thereof. The repair structure 140a is disposed on the peripheral region 114 of the base 110, and has at least one first repair line 141 and at least one second repair line 142. The second repair line 142 has a first sub-line 142a and a second sub-line 142b. The first sub-line 142a is located between the first repair line 141 and the second sub-line 142b. In the present embodiment of the invention, the first group 121, the second group 122, the third group 123, and the fourth group 124 are connected to the first pad group 125a, the second pad group 125b, the third pad group 125c, and the fourth pad group 125d, respectively, and the scan lines 120e are connected to the scan line pad group 125e. The array substrate 100 can further include a repair structure 140b. The repair structure 140b includes a third repair line 143 and a fourth repair line 144 disposed on the peripheral region 114. The fourth repair line 144 has a third sub-line 144a and a fourth sub-line 144b. The third sub-line 144a is located between the third repair line 143 and the fourth sub-line 144b. The first repair line 141 and the first sub-line 142a both cross over the first group 120a and the second group 120b, but the second sub-line 142b only crosses over the second group 120b. The third repair line 143 and the third sub-line 144a both cross over the third group 120c and the fourth group 120d, but the fourth sub-line 144b only crosses over the fourth group 120d.

Besides, the first repair line 141 and the second repair line 142 both disposed on one side of the base 110 are opposite to the third repair line 143 and the fourth repair line 144 both disposed on the other side of the base 110, preferably, to form a symmetric repair structure. The portion of the second repair line 142, which is perpendicular to the first sub-line 142a and the second sub-line 142b and parallel to the data lines, is referred as a bus line. The first sub-line 142a and the second sub-line 142b are arranged at the same side of the bus line and near to the same terminal of the bus lines. The first sub-line 142a and the second sub-line 142b are substantially parallel with each other.

Figures 1B, 1C:
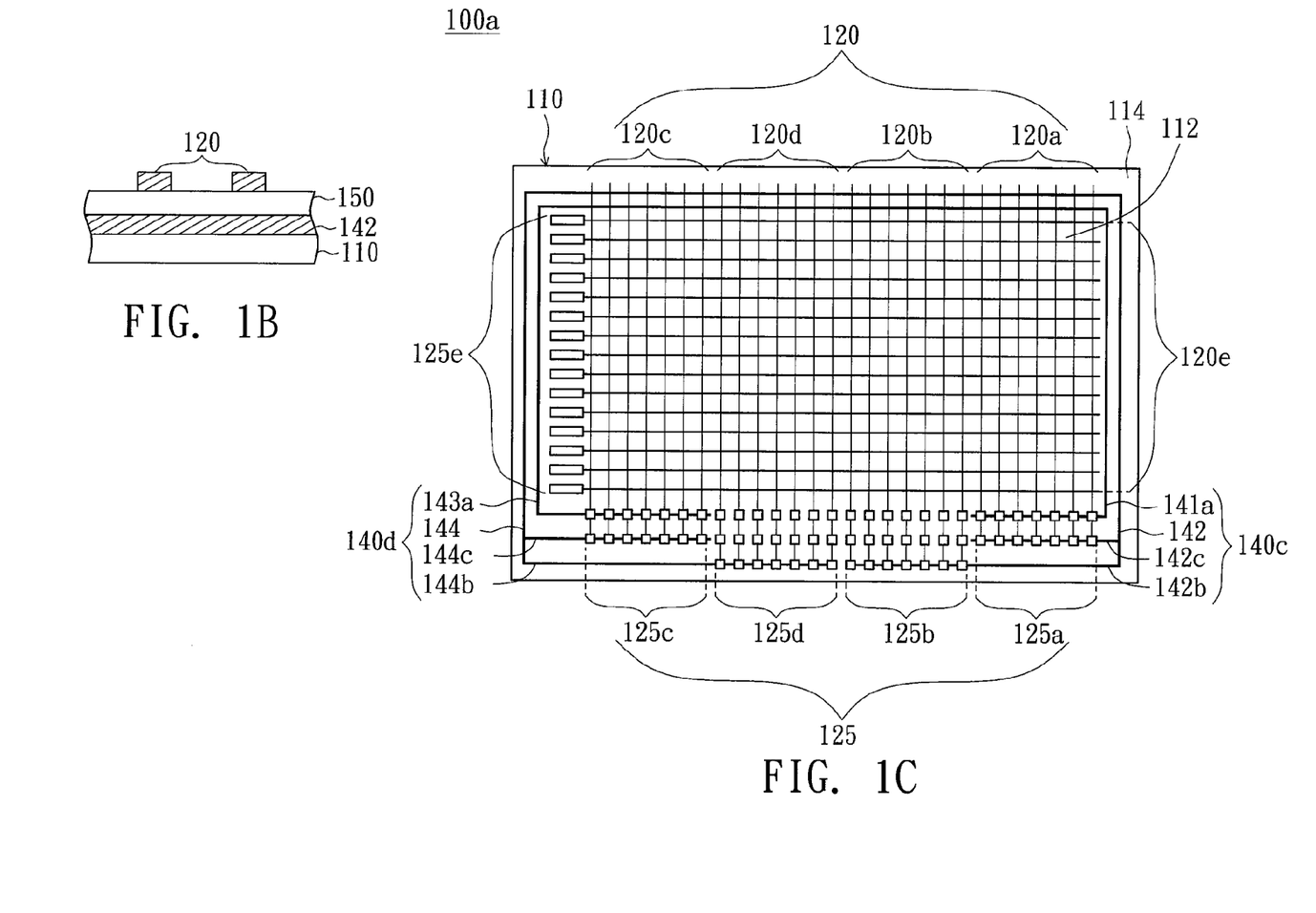
FIG. 1B is a cross-sectional view along the cross-sectional line A~A' of FIG. 1A.
FIG. 1C is a top view of a second array substrate according to a first embodiment of the present invention.

Referring to FIG. 1B, a cross-sectional view along the cross-sectional line A~A' of FIG. 1A is shown. The present embodiment of the invention is exemplified by the array substrate 100 of a bottom gate type TFT. The repair line and the metal layer (including the scan line, the gate, or other elements) are formed together. The second repair line 142 is disposed on the base 110, and the insulation layer 150 is disposed between the second repair line 142 and the signal line 120. Thus, when the repair line 142 is to be used, the insulation layer 150 is penetrated by melting for electrically connecting the repair line 142 with the signal lines 120.

Referring to FIG. 1C, a top view of a second array substrate according to a first embodiment of the present invention is shown. The array substrate 100a differs with the array substrate 100 in that both the first repair line 141a and the first sub-line 142c of the repair structure 140c only cross over the first group 120a, and both the third repair line 143a and the third sub-line 144c of the repair structure 140d only cross over the third group 120c.

Figure 1D:
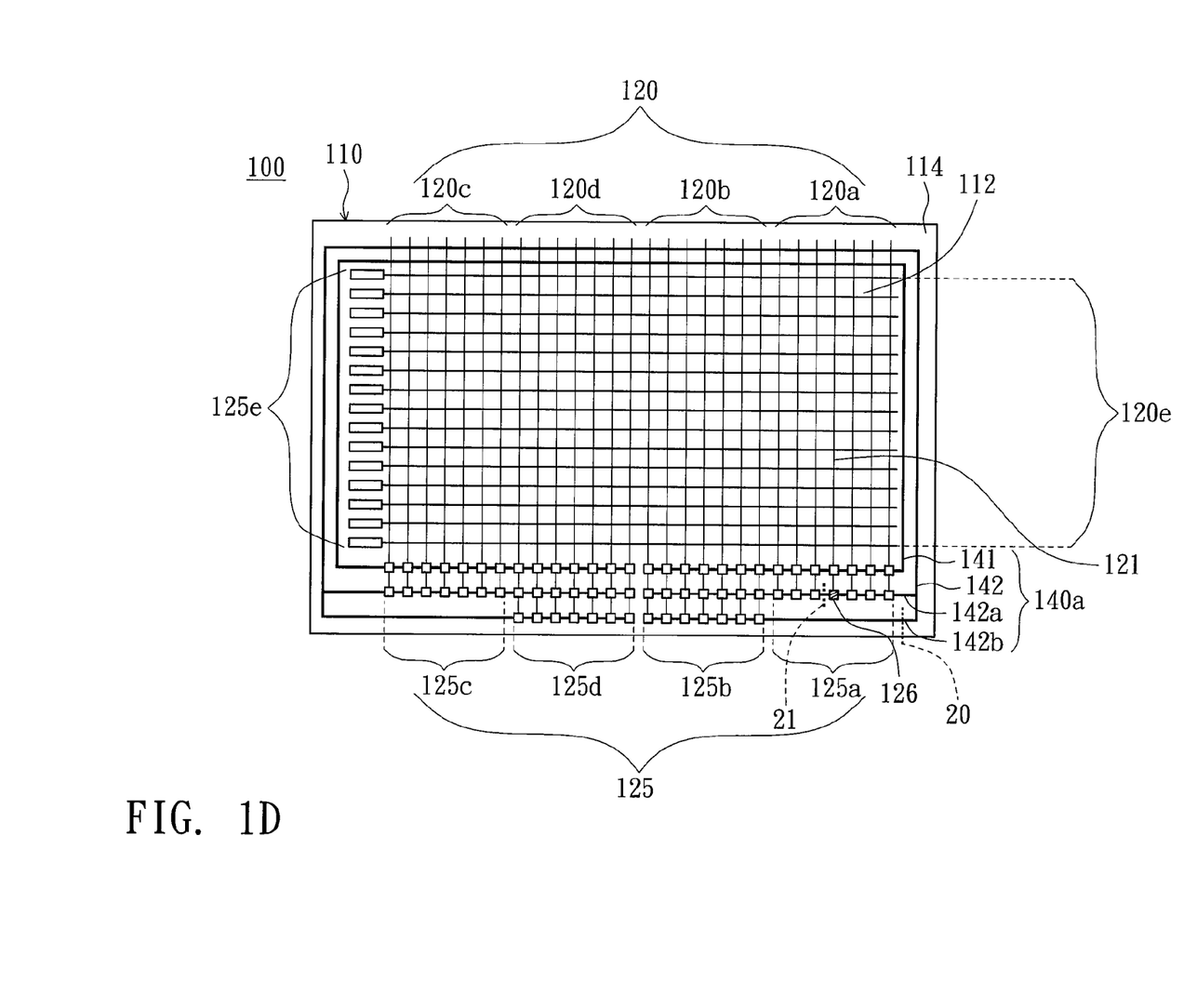
FIG. 1D shows an array substrate of the present invention after repairing.

Referring to FIG. 1D, an array substrate of the present invention after repairing is shown. The array substrate 100 is taken for example. When defect occurs to one signal line of the first group 120a, such as the data line 121 for example, the first sub-line 142a and the signal line 121 are electrically connected. The way of electrical connection is achieved by penetrating through the insulation layer 150 disposed between the repair line and the signal lines 120 of FIG. 1B. For example, a welding point is generated at the pad 126 such that the first sub-line 142a and the signal line 121 are coupled together. To avoid the decay in the transmission of signals, preferably, the second sub-line 142b and the second repair line 142 are broken off by a cutting line 20, and the first sub-line 142a is broken off by a cutting line 21 at the place near the signal line 121. That is, the first sub-line 142a is broken off at the inter-space between the defected signal line 121 and its next signal line. Preferably, the cutting line 20 and 21 are accomplished by laser cutting.

Figure 1E:
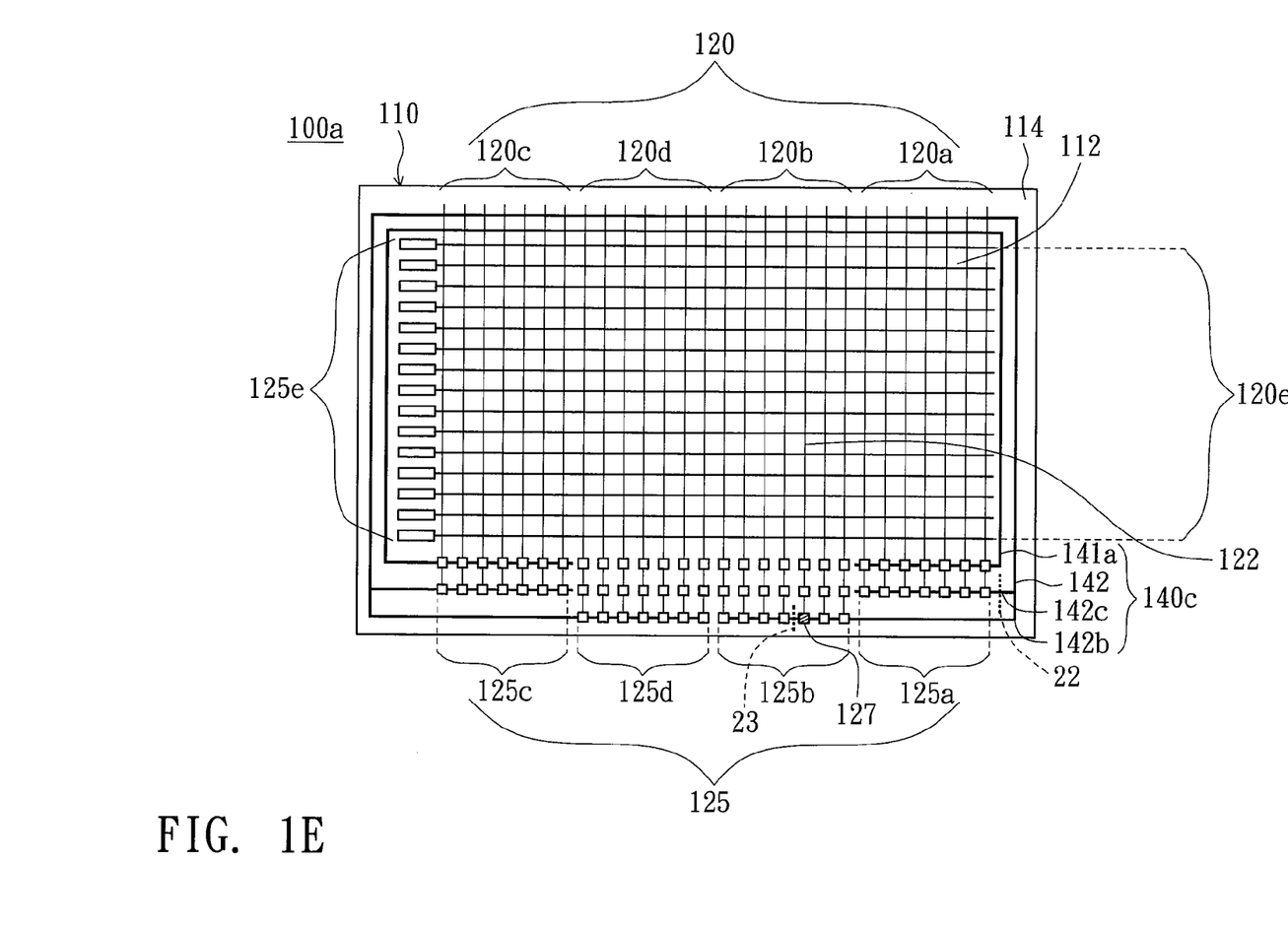
FIG. 1E shows another array substrate of the present invention after repairing.

Referring to FIG. 1E, another array substrate of the present invention after repairing is shown. The array substrate 100a is taken for example. When defect occurs to one signal line of the second group 120b, such as the signal line 122 for example, the second sub-line 142b and the signal line 122 are electrically connected. The way of electrical connection is achieved by penetrating through the insulation layer 150 disposed between the repair line and the signal line 120. For example, a welding point is generated at the pad 127 such that the second sub-line 142b and the signal line 122 are coupled together. To avoid the decay in the transmission of signals, preferably, the first sub-line 142c and the second repair line 142 are broken off by a cutting line 22, and the second sub-line 142b is broken off by a cutting line 23 at the place near the signal line 122. That is, the second sub-line 142b is broken off at the inter-space between the signal line 122 and its next signal line. It is noted that the above embodiment is exemplified by the repairing when defect occurs to the signal line at one side of base and one repair line corresponding to one signal line. However, the repairing method of the invention is also applicable to the situations when defect occurs to at least one of the signal lines at both sides of base and when there are multiple repair lines corresponding to the signal line.

Second Embodiment

Figure 2A:
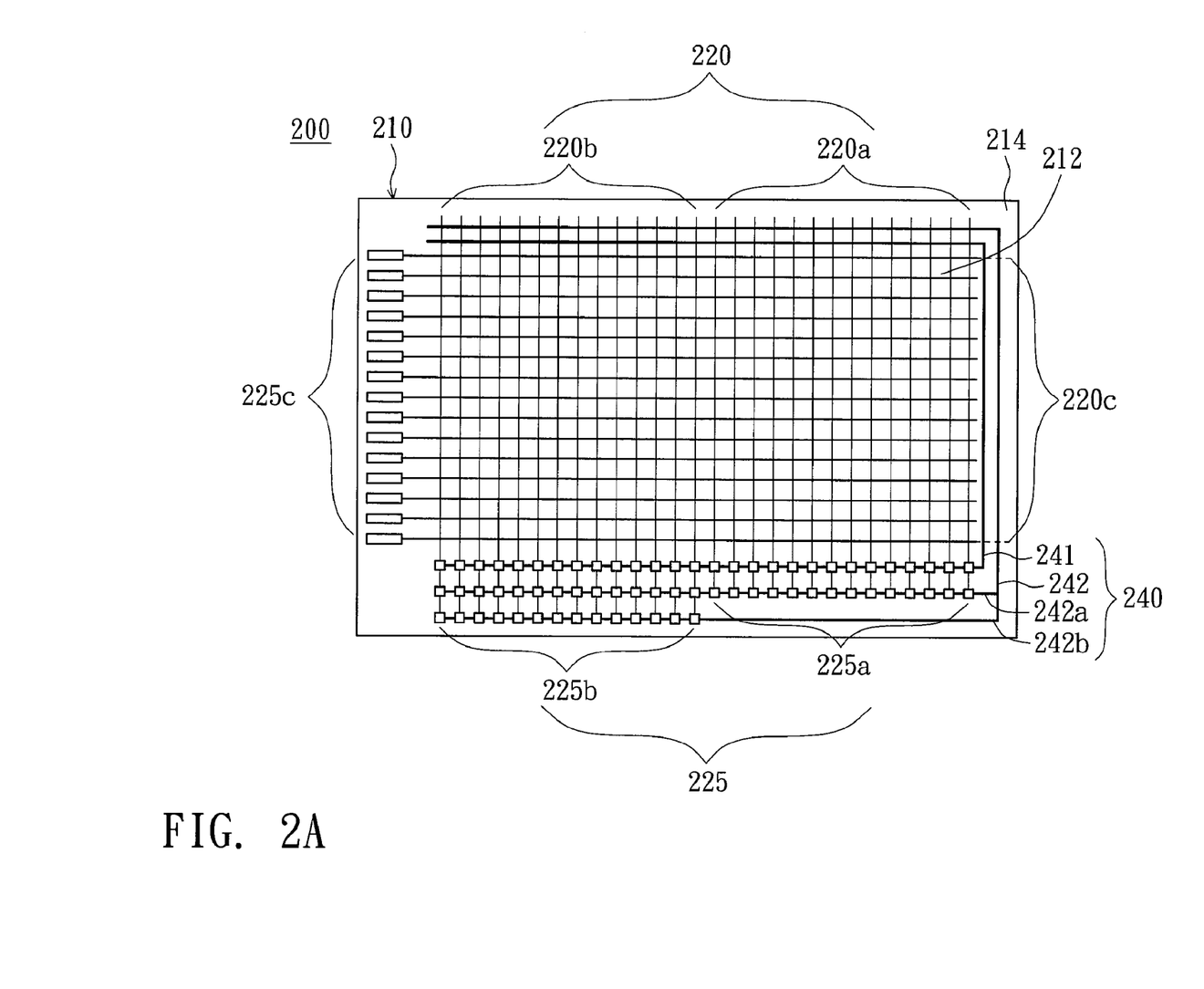
FIG. 2A is a top view of a first array substrate according to a second embodiment of the present invention.
Figure 2B:
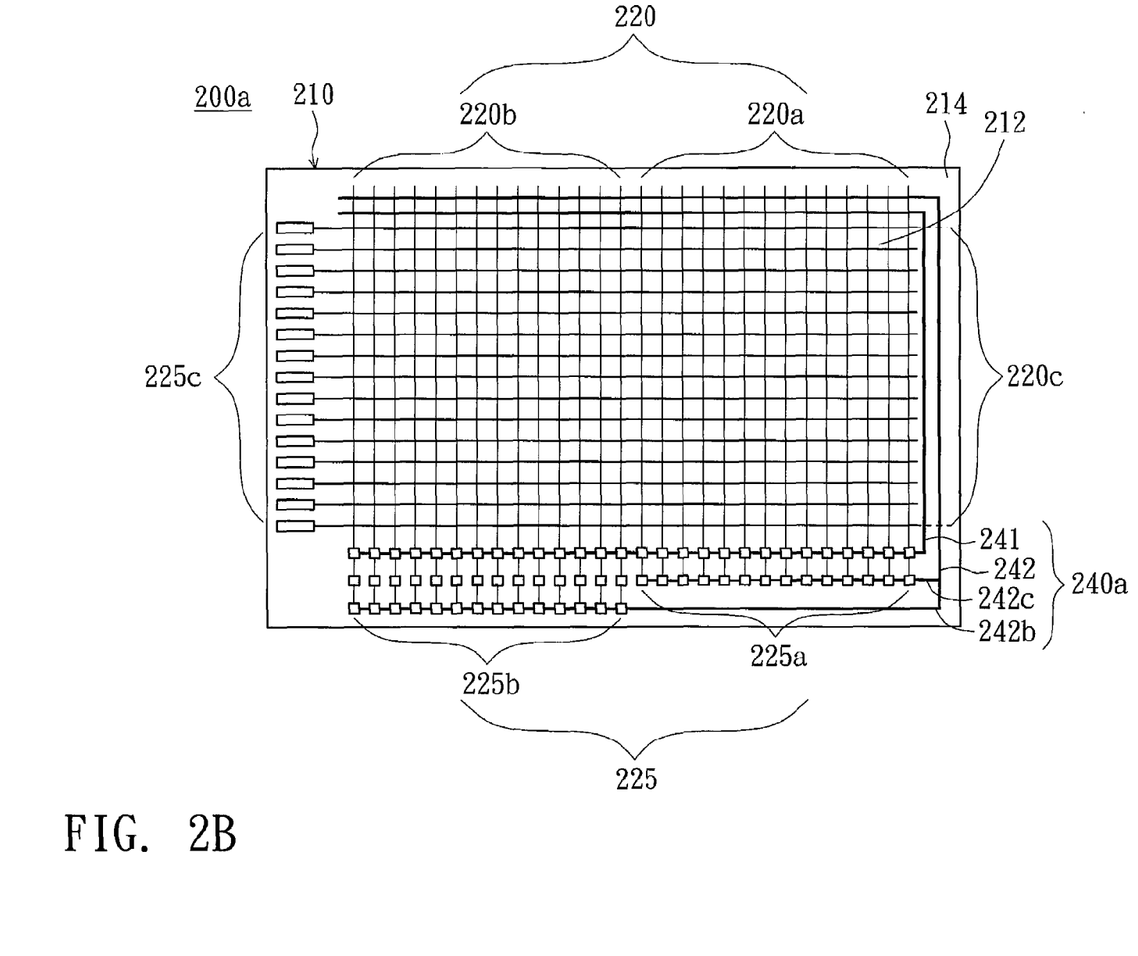
FIG. 2B is a top view of a second array substrate according to a second embodiment of the present invention.

Referring to FIG. 2A and FIG. 2B. FIG. 2A is a top view of a first array substrate according to a second embodiment of the invention. FIG. 2B is a top view of a second array substrate according to a second embodiment of the invention. The array substrates 200 and 200a both have a first repair line 241 and a second repair line 242. The array substrate 200 is taken for example. The base 210 has an active region 212 and a peripheral region 214 adjoining to the active region 212. The scan lines 220c is perpendicular to both the first group 220a of the signal lines 220 and the second group 220b of the signal lines 220, and all are disposed on the base 210. The first group 220a and the second group 220b are connected to both the first pad group 225a and the second pad group 225b of the pad 225, respectively. The scan lines 220c are connected to the scan line pad group 225c. The repair structure 240 is disposed on peripheral region 214 of the base 210, and has a first repair line 241 and a second repair line 242. The second repair line 242 has a first sub-line 242a and a second sub-line 242b. The first sub-line 242a is located between the first repair line 241 and the second sub-line 242b. In the present embodiment of the invention, the signal lines 220 are divided into a first group 220a, a second group 220b and a number of scan lines 220c. The first group 220a and the second group 220b are connected to both the first pad group 225a and the second pad group 225b of the pad 250, respectively. The scan lines are connected to the scan line pad group 225c. The first repair line 241 and the first sub-line 242a both cross over the first group 220a and the second group 220b, but the second sub-line 242b only crosses over the second group 220b. The array substrate 200a differs with the array substrate 200 in that the first sub-line 242c of the repair structure 240a only crosses over the first group 220a.

When defect occurs to at least one of the signal lines of the present embodiment of the invention, the method for using the repair line of the present embodiment of the invention is much the same with the method disclosed in the first embodiment, and is not repeated here.

Any one who is skilled in the technology of the present invention will understand that the technology of the present invention is not limited thereto. For example, the signal lines are grouped according to whether a signal line is even-numbered or odd-numbered, and respectively correspond to different repair sub-lines, or the signal lines are grouped according to the length of the signal lines, such that different groups of the signal lines have different lengths, and the repair sub-lines corresponding to the signal lines form a stepped-shape. If the available area of the base permits, it is preferred that the chip on film (COF) display module adopts the structure disclosed in the first embodiment but is not limited thereto. If the availabel area of the base does not permit and the repair line can not be disposed at the input end of the scan line, it is preferred that the chip on glass (COG) display module adopts the structure disclosed in the second embodiment but is not limited thereto. The above embodiments are exemplified by the repairing of the data lines. However, in practical application, the above embodiments are also applicable to the repairing of the scan lines.

Moreover, the above embodiments of the invention are applied in display apparatus. Examples of the display apparatus include monitor, TV, notebook, touch panel, display monitor of portable electronic product (such as mobile phone, digital camera (DC), digital video (DV), digital audio device, personal digital assistant (PDA), black berry, or other similar products), handheld game device (such as Game Boy, play station portable (PSP), Nintendo DS Lite, or other similar game devices), vehicle audio/video device, outdoor or indoor display panel, outdoor or indoor indicating panel, or likes. Apart from the abovementioned applications, the display apparatus also includes different types of display apparatus such as organic light-emitting diodes display (OLED), plasma display panel (PDP), liquid crystal display (LCD), and field emission display (FED).

According to the array substrate and the method for repairing thereof disclosed in the above embodiments of the invention, at least two sub-lines are extended from at least one of the repair lines. The sub-lines respectively correspond to different groups of signal lines, and cross over less signal lines. Thus, the signal decay caused by RC loading is mitigated, and the repair line will function properly.

The above-description is a detailed illustration for a variety of preferred embodiments of the present invention. The embodiments should not be construed as limiting the scope of the invention. Rather, it is intended to cover various modifications and similar arrangements included within the spirit and scope of the appended claims, the scope of which should be accorded the broadest interpretation so as to encompass all such modifications and similar structure.

What is claimed is:

1. An array substrate, comprising:
a base;
a plurality of signal lines disposed on the base; and
at least one repair structure, disposed on the base, having at least one first repair line and at least one second repair line including a first sub-line and a second sub-line, and the first sub-line of the at least one second repair line being located between the first repair line and the second sub-line of the at least one second repair line;
wherein at least one of the first sub-line and the second sub-line is through at least one welding point and is welded with one of the signal lines, and at least one of the at least one first repair line, the first sub-line of the at least one second repair line, and the second sub-line of the at least one second repair line has at least one cutting line.

2. The array substrate according to claim 1, wherein the signal lines has a first group and a second group, and so that the first sub-line of the at least one second repair line crosses over the first group of the signal lines.

3. The array substrate according to claim 2, wherein the first sub-line of at least one second repair line is through the welding point welded with one of the signal lines of the first group, and the cutting line is located at the second sub-line of the at least one second repair line.

4. The array substrate according to claim 2, wherein the cutting line is adjacent to the welding point disposed at the first sub-line of the at least one second repair line.

5. The array substrate according to claim 1, wherein the second sub-line of the at least one second repair line crosses over the second group of the signal lines.

6. The array substrate according to claim 5, wherein the second sub-line of the at least one second repair line is through the welding point welded with one of the signal lines of the second group, and the cutting line is located at the first sub-line of the at least one second repair line.

7. The array substrate according to claim 5, wherein the cutting line is adjacent to the welding point disposed at the second sub-line of the at least one second repair line.

8. A display panel incorporating the array substrate according to claim 1.

9. A display apparatus incorporating the array substrate according to claim 1.

10. An array substrate, comprising:
a base having an active region and a peripheral region adjoining to the active region;
a plurality of signal lines disposed on the base; and
at least one repair structure, disposed on the peripheral region of the base, having at least one first repair line and at least one second repair line having a first sub-line and a second sub-line, and the first sub-line of the at least one second repair line being located between the at least one first repair line and the second sub-line of the at least one second repair line;
the signal lines have a plurality of groups, and the at least one first repair line crosses over at least one group of the signal lines; and at least one of the groups of the signal lines is not crossed over by one of the first sub-line of the at least one second repair line and the second sub-line of the at least one second repair line
wherein the signal lines have a first group and a second group;
the first sub-line of the at least one second repair line crosses over the first group of the signal lines but does not cross over the second group of the signal lines; and the second sub-line of the at least one second repair line crosses over the second group of the signal lines but does not cross over the first group of the signal lines.

11. An array substrate, comprising:
a base having an active region and a peripheral region adjoining to the active region;
a plurality of signal lines disposed on the base; and
at least one repair structure, disposed on the peripheral region of the base, having at least one first repair line and at least one second repair line having a plurality of sub-lines and a bus line, wherein the bus line has two terminals and two sides, and the sub-lines are arranged at same side of the bus line and near to same terminal of the bus line.

12. The array substrate according to claim 11, wherein one of the sub-lines cross over at least one group of the signal lines and another of the sub-lines cross over another group of the signal lines.

13. The array substrate according to claim 11, wherein the first repair line cross over at least one group of the signal lines.

14. The array substrate according to claim 11, wherein one of the sub-lines located between another of the sub-lines and the first repair line.

15. The array substrate according to claim 11, wherein the sub-lines are substantially parallel with each other.

* * * * *